US 8,687,773 B2

(12) United States Patent
Skladman et al.

(10) Patent No.: US 8,687,773 B2
(45) Date of Patent: *Apr. 1, 2014

(54) METHOD AND SYSTEM FOR INTERFACING SYSTEMS UNIFIED MESSAGING WITH LEGACY SYSTEMS LOCATED BEHIND CORPORATE FIREWALLS

(75) Inventors: Julia Skladman, Northbrook, IL (US); Robert J. Thornberry, Jr., Wheaton, IL (US); Bruce A. Chatterley, Redmond, WA (US); Alexander Siu-Kay Ng, Richmond Hill (CA); Bruce L. Peterson, Crystal Lake, IL (US)

(73) Assignees: AT&T Intellectual Property I, L.P., Atlanta, GA (US); Northern Telecom Limited, Montreal (CA)

( * ) Notice: Subject to any disclaimer, the term of this patent is extended or adjusted under 35 U.S.C. 154(b) by 1641 days.

This patent is subject to a terminal disclaimer.

(21) Appl. No.: 11/651,335

(22) Filed: Jan. 8, 2007

(65) Prior Publication Data

US 2007/0274473 A1  Nov. 29, 2007

Related U.S. Application Data

(63) Continuation of application No. 10/881,355, filed on Jun. 30, 2004, now Pat. No. 7,162,014, which is a continuation of application No. 10/264,137, filed on Oct. 3, 2002, now Pat. No. 6,868,144, which is a continuation of application No. 09/515,030, filed on Feb. 29, 2000, now Pat. No. 6,487,278.

(51) Int. Cl.
*H04M 1/64* (2006.01)

(52) U.S. Cl.
USPC .................. 379/88.13; 379/88.17; 379/88.18

(58) Field of Classification Search
USPC ............ 379/67.1, 88.13, 88.17, 88.18, 88.22, 379/88.25, 908, 88.14; 455/415, 461; 726/11; 395/187.01; 709/206
See application file for complete search history.

(56) References Cited

U.S. PATENT DOCUMENTS

| 5,040,209 A | 8/1991 | Greenberg et al. |
| 5,327,486 A | 7/1994 | Wolff et al. |
| 5,608,786 A | 3/1997 | Gordon |
| 5,625,675 A | 4/1997 | Katsumaru et al. |

(Continued)

OTHER PUBLICATIONS

"Ipnet Water frees admins", PC Week, Feb. 23, 1998, v15 n8, p. 105(2).

(Continued)

*Primary Examiner* — Mohammad Islam
*Assistant Examiner* — Van D Huynh
(74) *Attorney, Agent, or Firm* — Jackson Walker L.L.P.

(57) ABSTRACT

A system and method for interfacing unified message processing systems with legacy voice mail, e-mail and facsimile systems, located behind corporate firewalls. The system includes a unified message server, a proxy interface and a message protocol convertor. The proxy interface is configured to access the legacy system in response to a request from a unified message server. Messages stored on the legacy system are converted by a protocol convertor to a predetermined format compatible with the unified message server. The converted messages are then transferred to a unified message server which is capable of providing messages from different messaging system, such as voice mail, e-mail and facsimile to users in a predetermined format. The invention permits enterprise wide communication systems to provide unified messaging without abandoning pre-existing legacy messaging system.

12 Claims, 11 Drawing Sheets

(56) References Cited

U.S. PATENT DOCUMENTS

| | | | |
|---|---|---|---|
| 5,652,789 A | 7/1997 | Miner et al. | |
| 5,675,507 A | 10/1997 | Bob, II et al. | |
| 5,680,551 A | 10/1997 | Martino et al. | |
| 5,689,642 A | 11/1997 | Harkins et al. | |
| 5,706,334 A | 1/1998 | Balk et al. | |
| 5,708,699 A | 1/1998 | Concepcion et al. | |
| 5,742,668 A | 4/1998 | Pepe et al. | |
| 5,742,905 A * | 4/1998 | Pepe et al. | 455/461 |
| 5,768,503 A | 6/1998 | Olkin et al. | |
| 5,796,394 A | 8/1998 | Wicks et al. | |
| 5,796,806 A | 8/1998 | Birchbichler et al. | |
| 5,822,405 A | 10/1998 | Astarabadi | |
| 5,828,833 A * | 10/1998 | Belville et al. | 726/11 |
| 5,841,839 A | 11/1998 | Fogg et al. | |
| 5,841,850 A | 11/1998 | Fan et al. | |
| 5,857,201 A | 1/1999 | Wright et al. | |
| 5,870,605 A | 2/1999 | Bracho et al. | |
| 5,884,033 A | 3/1999 | Duvall et al. | |
| 6,025,931 A | 2/2000 | Bloomfield | |
| 6,073,165 A | 6/2000 | Narasimhan et al. | |
| 6,157,706 A | 12/2000 | Rachelson | |
| 6,167,253 A | 12/2000 | Farris et al. | |
| 6,233,318 B1 | 5/2001 | Picard et al. | |
| 6,263,064 B1 | 7/2001 | O'Neal et al. | |
| 6,298,232 B1 | 10/2001 | Marin et al. | |
| 6,411,684 B1 * | 6/2002 | Cohn et al. | 379/88.14 |
| 6,418,200 B1 | 7/2002 | Ciccolella et al. | |
| 6,438,215 B1 | 8/2002 | Skladman et al. | |
| 6,442,592 B1 * | 8/2002 | Alumbaugh et al. | 709/206 |
| 6,477,240 B1 | 11/2002 | Lim et al. | |
| 6,487,278 B1 | 11/2002 | Skladman et al. | |
| 6,498,835 B1 | 12/2002 | Skladman et al. | |
| 6,529,500 B1 | 3/2003 | Pandharipande | |
| 6,553,102 B1 | 4/2003 | Fogg et al. | |
| 6,556,586 B1 | 4/2003 | Sipila | |
| 6,560,234 B1 | 5/2003 | Ben-Michael et al. | |
| 6,693,994 B1 | 2/2004 | Stern | |
| 6,704,394 B1 | 3/2004 | Kambhatla et al. | |
| 6,868,144 B2 | 3/2005 | Skladman et al. | |
| 7,209,551 B1 | 4/2007 | Schroeder et al. | |
| 2003/0012348 A1 | 1/2003 | Skladman et al. | |
| 2003/0123622 A1 * | 7/2003 | Gifford et al. | 379/88.13 |

OTHER PUBLICATIONS

"EventCenter 1.0 gains speed", InfoWorld, Sep. 29, 1997, v19 a39 p. 72A(1).

"Coping with the deluge, effective management key when nonstop E-mail hampers productivity", Computerworld, May 17, 1993, v27 a20, p. 53(2).

"E-mail notification", Computerworld, Jun. 22, 1998, v32 n25, p. 41(1).

"Constellation approaches: Netscape's future Web client to deliver a universal interface", InfoWorld, Mar. 3, 1997, v19 n9, p. 1(2).

* cited by examiner

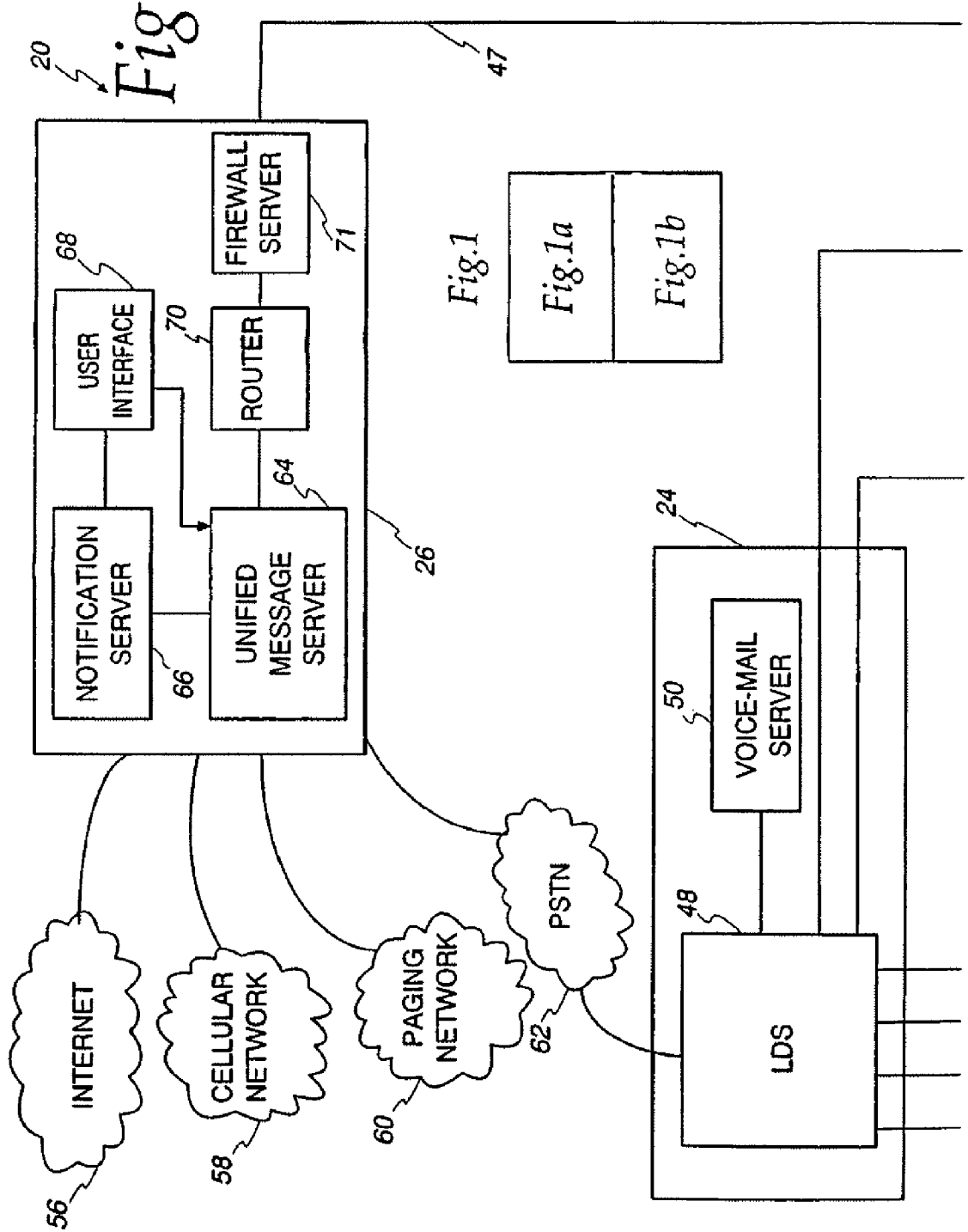

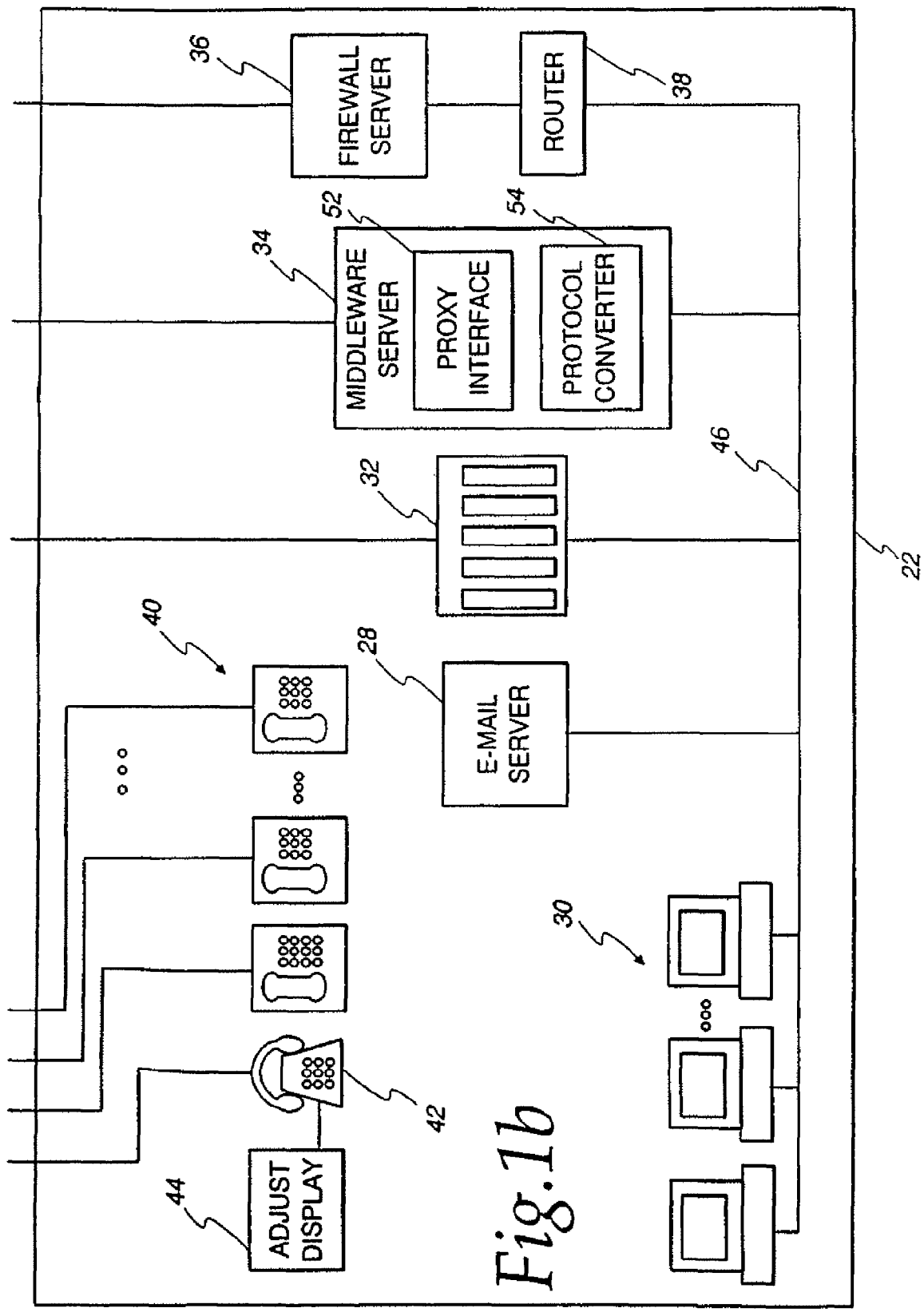

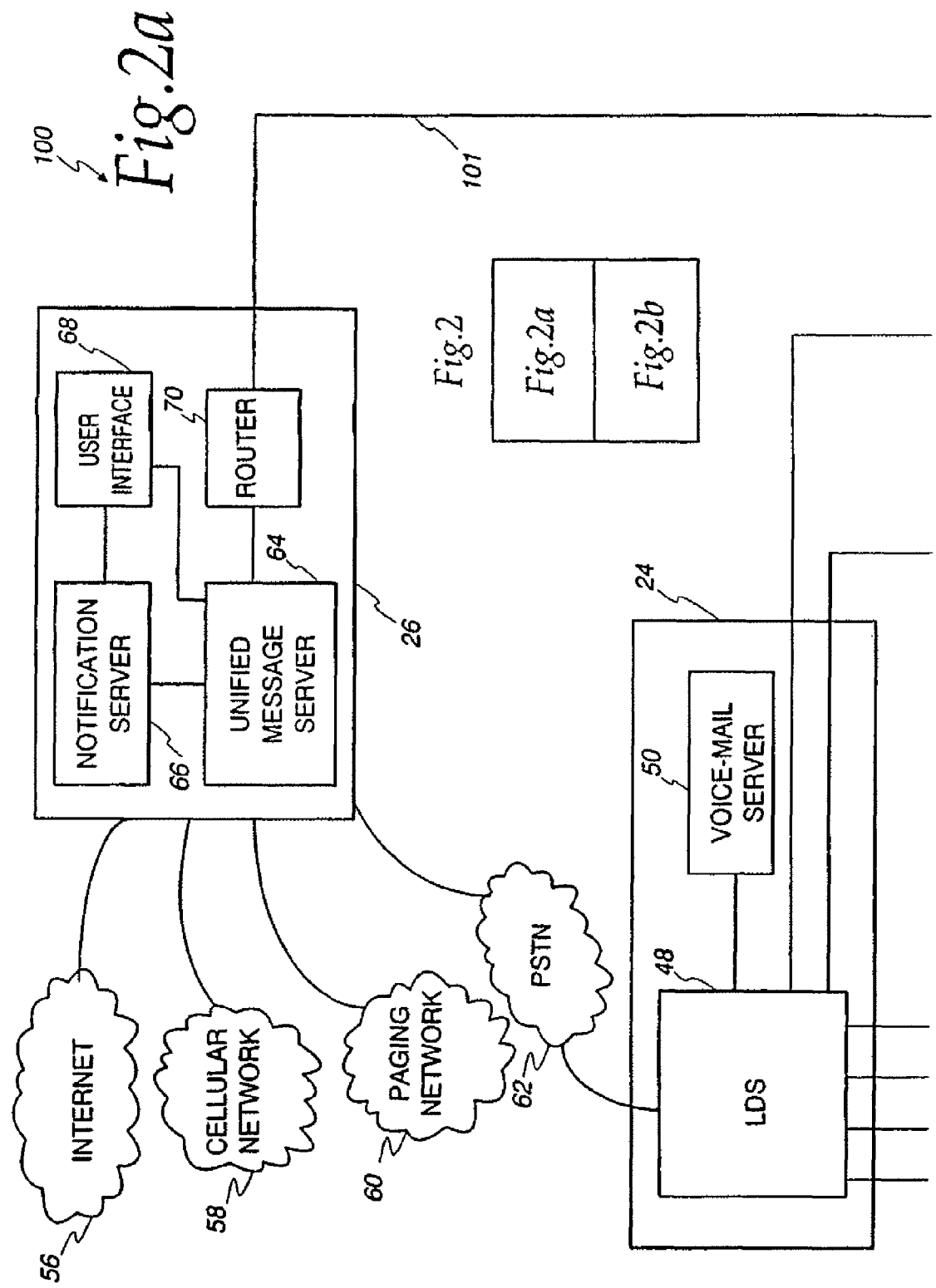

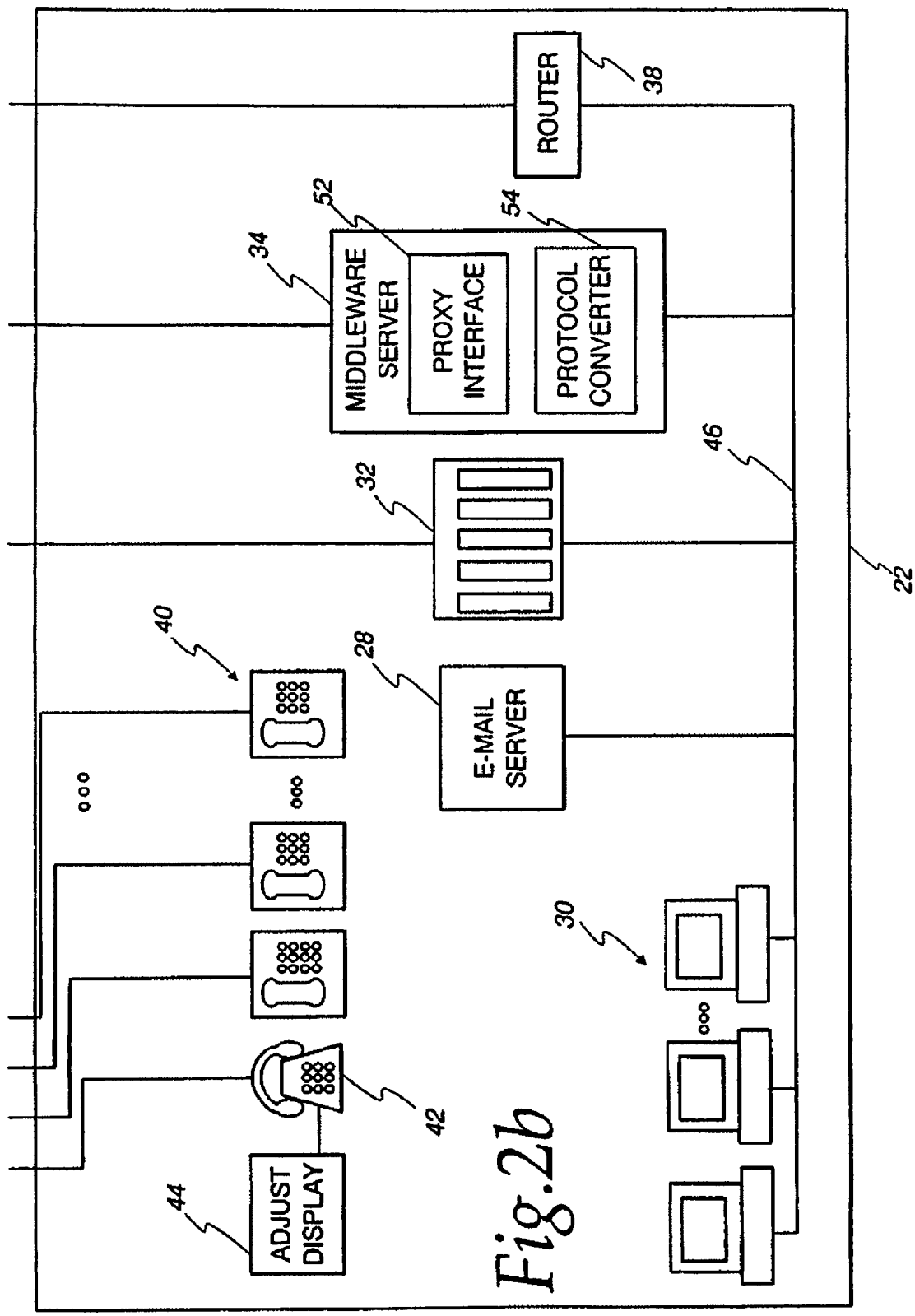

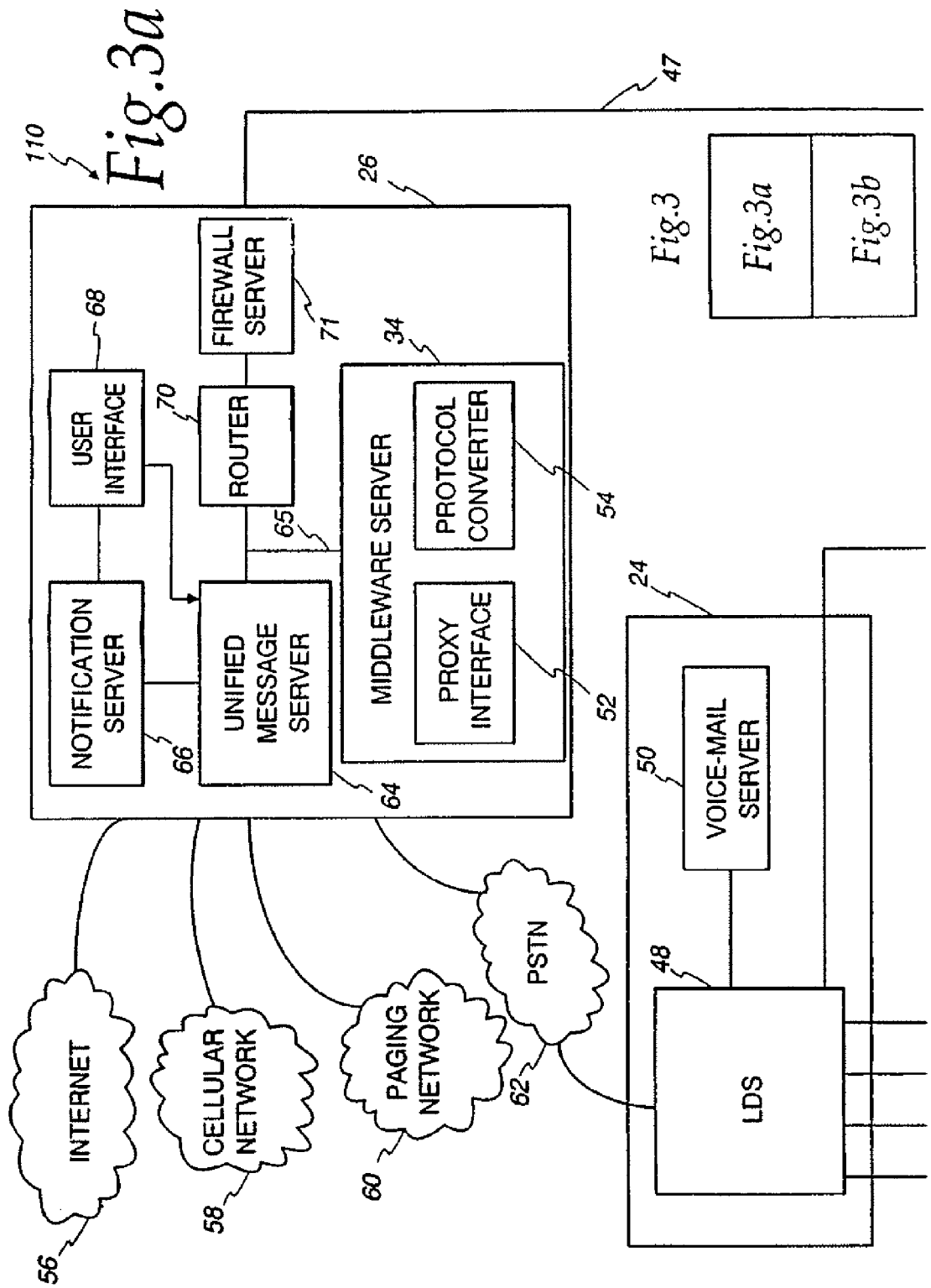

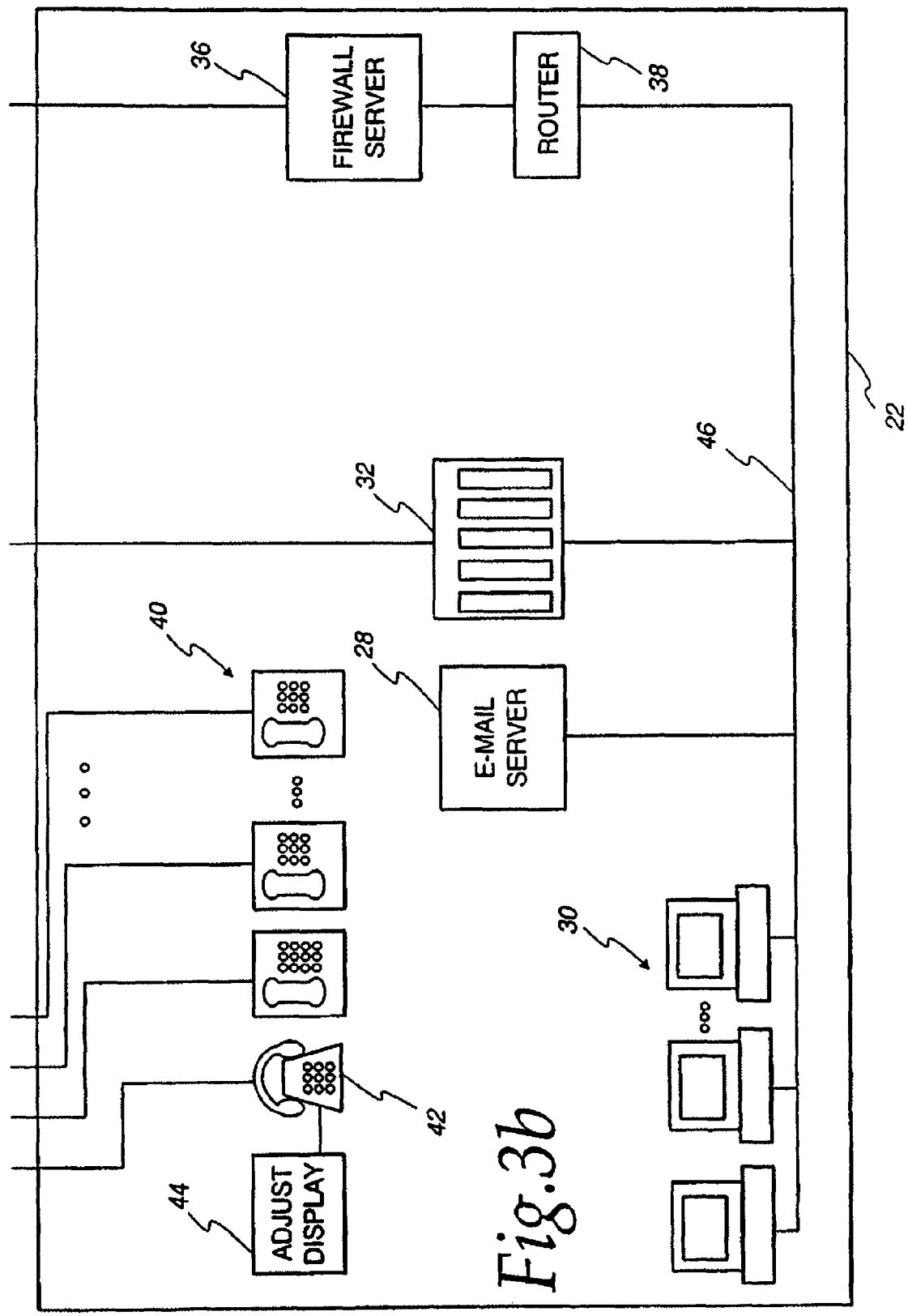

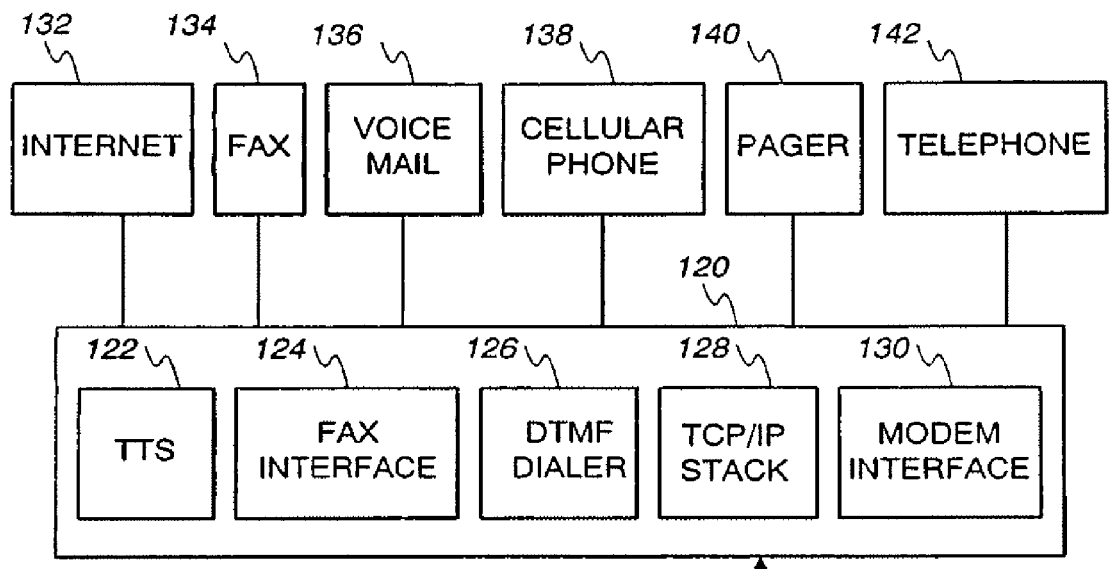
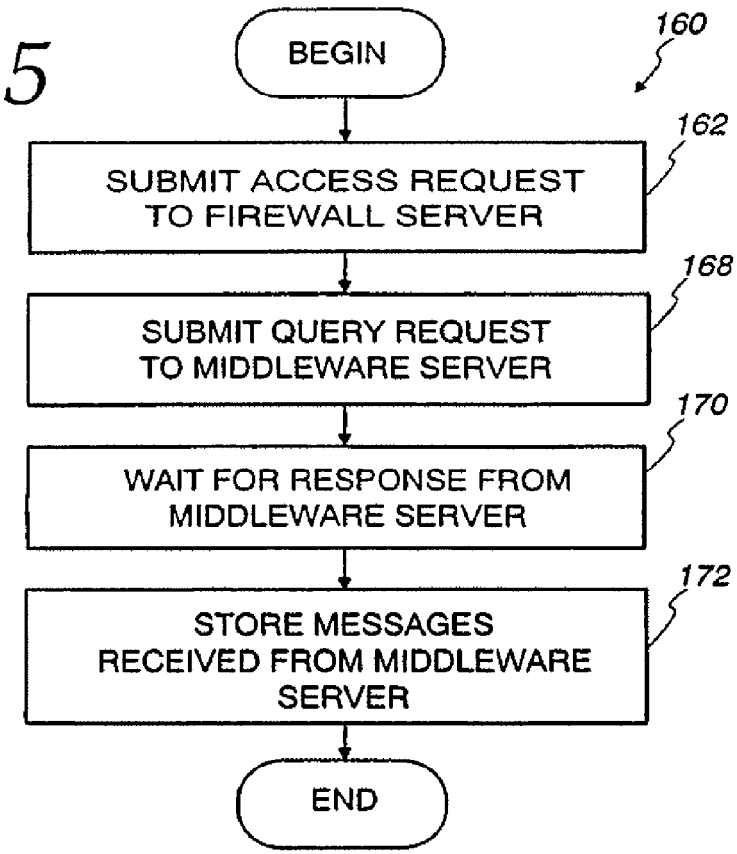

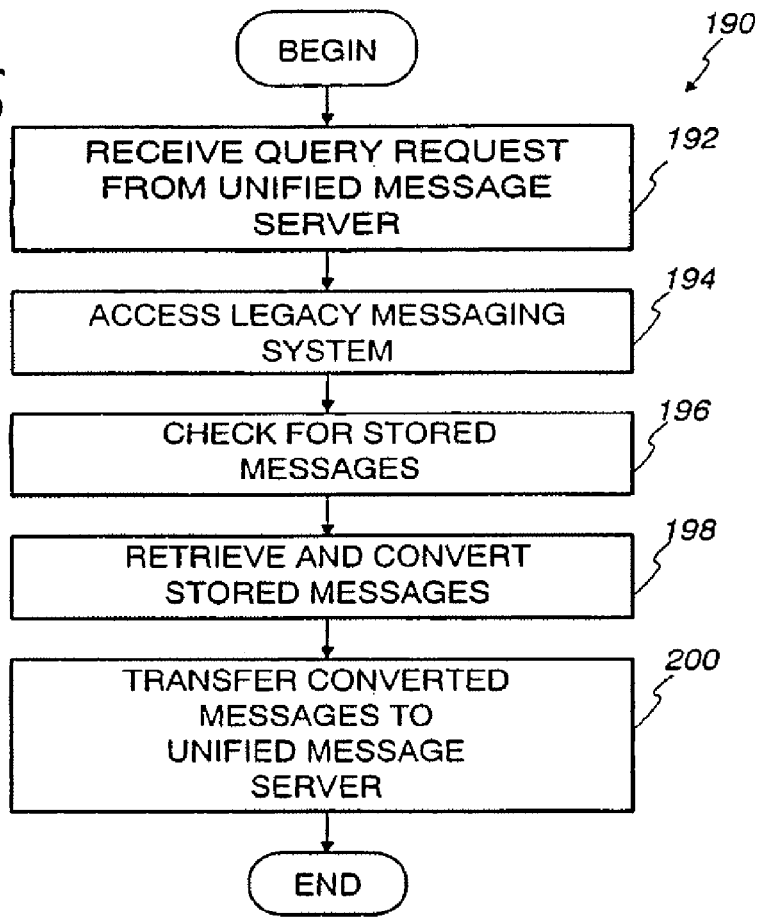
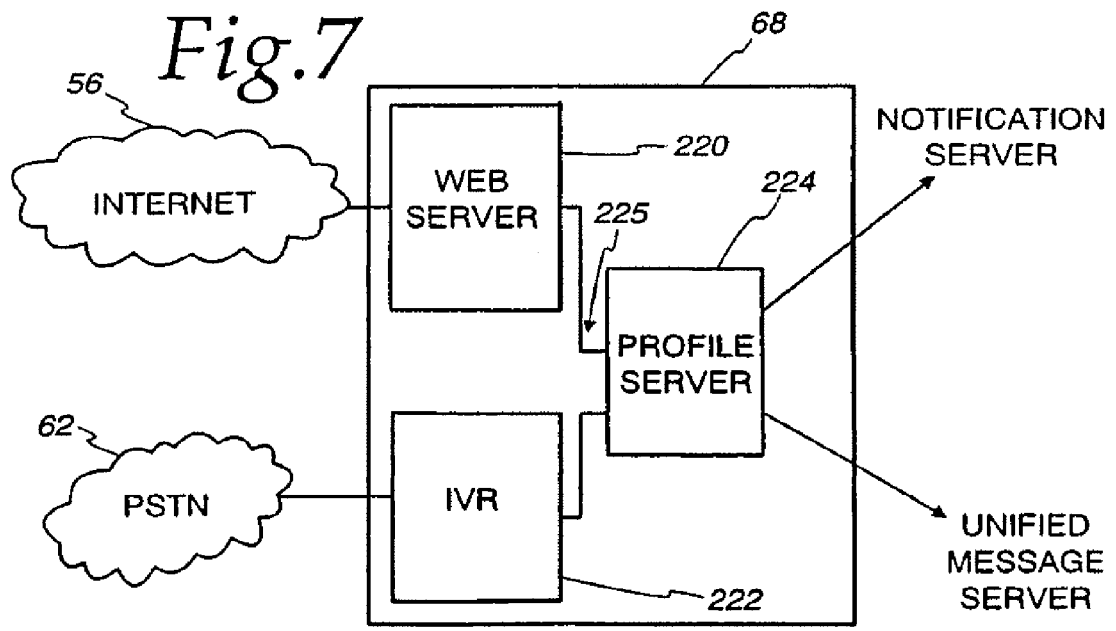

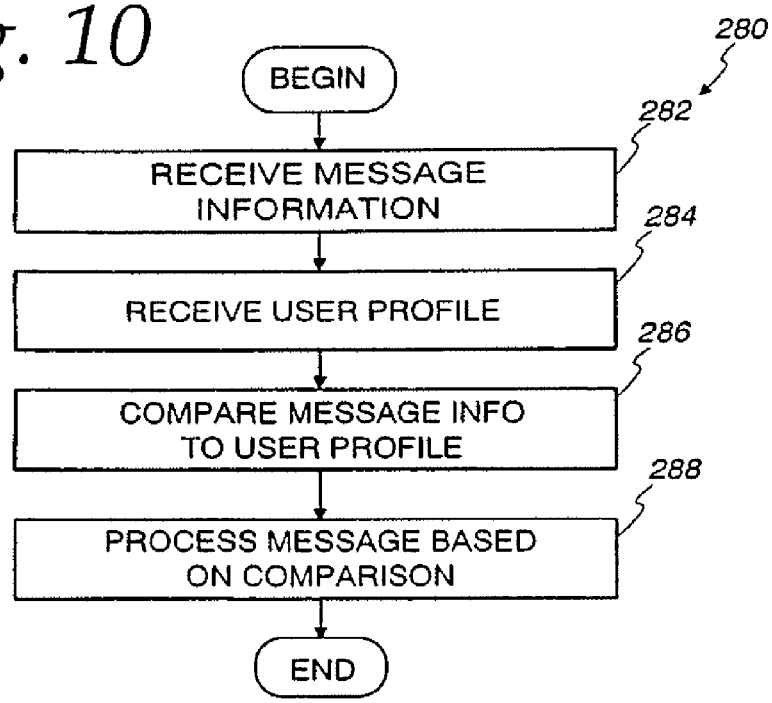
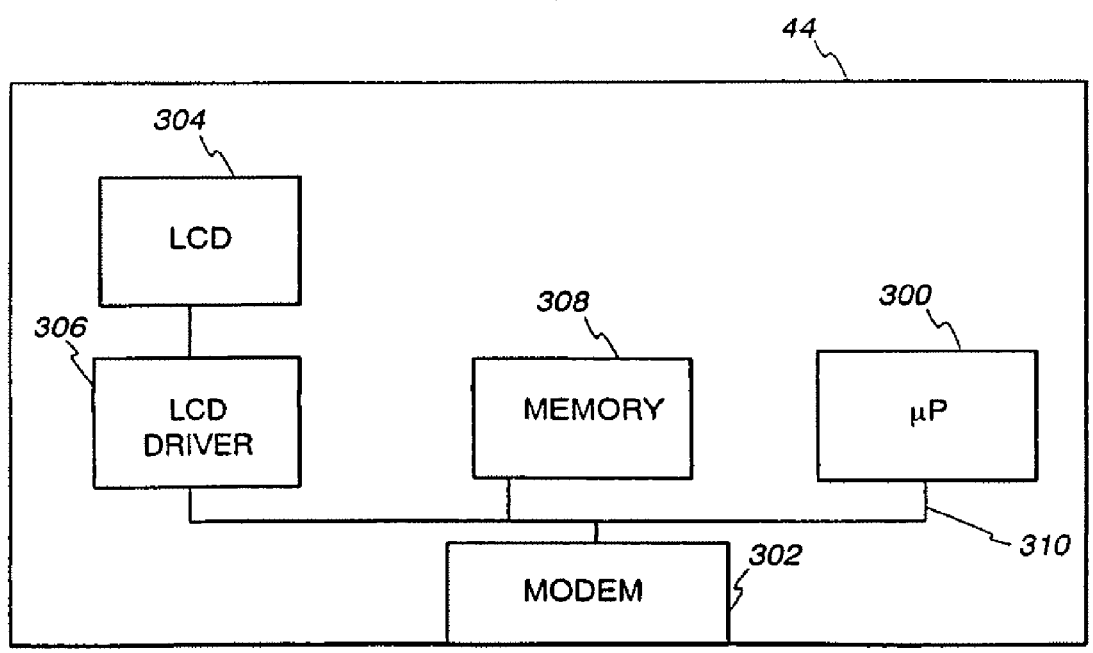

METHOD AND SYSTEM FOR INTERFACING SYSTEMS UNIFIED MESSAGING WITH LEGACY SYSTEMS LOCATED BEHIND CORPORATE FIREWALLS

PRIORITY CLAIM

This patent application is a Continuation of U.S. patent application Ser. No. 10/881,355, filed Jun. 30, 2004, entitled Method and System for Interfacing Systems Unified Messaging with Legacy Systems Located Behind Corporate Firewalls; which is a continuation of U.S. patent application Ser. No. 10/264,137, entitled Method and System for Interfacing Systems Unified Messaging with Legacy Systems Located Behind Corporate Firewalls, filed on Oct. 3, 2002, now U.S. Pat. No. 6,868,144; which is a continuation of U.S. patent application Ser. No. 09/515,030 entitled Method and System for Interfacing Systems Unified Messaging with Legacy Systems Located Behind Corporate Firewalls, filed on Feb. 29, 2000, now U.S. Pat. No. 6,487,278; the contents of which are incorporated herein by reference.

TECHNICAL FIELD OF THE INVENTION

The present invention relates generally to communication systems, and in particular to a communication system for providing unified messaging services for transferring different types of electronic messages.

BACKGROUND OF THE INVENTION

In business and consumer environments, several types of electronic messages are commonly used. These message types include voice mail, e-mail and facsimile (fax). Each type of electronic message requires its own transmission protocol and access mechanism. For instance, voice mail messages are typically transferred using a switched telephone network. To access conventional voice mail messages, a user must dial into a voice mail server using a telephone. In contrast, e-mail messages rely on different protocols and access mechanisms. E-mail messages are typically sent over computer networks, and to access e-mail messages, the user must usually login to a computer.

The commonplace use of different message types requires users to access different messaging systems to retrieve all of their messages: This can be time consuming and burdensome. To overcome this problem, unified messaging systems have been developed. In these systems, voice mail, e-mail, fax, and other message types can be received by the unified system for retrieval by the user using a single access interface. Communication and message storage can be centralized, while retrieval of messages can be accomplished with a user selected access mechanism. For example, in a unified environment, a user may choose to receive all incoming faxes, voice mails and e-mails by way of an e-mail account. To check messages, the user needs only to check the e-mail account, instead of individually checking the voice mail, e-mail and fax accounts. Thus, unified messaging systems significantly improve the electronic message environment by providing a single access point for different types of messages.

Unified messaging services are currently available over the Internet. One such service is Personal Telecom, provided by JFAX.COM, Inc. Personal Telecom permits subscribers to access voice mail, e-mail or fax by way of an Internet page or a phone call to an automated call processing center. A drawback to systems, such as JFAX, is that they do not interface to existing ("legacy") messaging systems, particularly those located behind corporate firewalls.

Many business enterprises have invested significantly in voice mail and e-mail systems for use in their workplace environments. These legacy systems generally not integrated to provide unified messaging. Moreover, current unified messaging systems do not can be interface to these preexisting voice and e-mail systems. Thus, for many business enterprises, migrating to a unified messaging system would require scrapping substantial investment in legacy messaging systems. Accordingly, there is a need for a method and system of incorporating legacy messaging systems into a modern unified messaging environment.

BRIEF DESCRIPTION OF THE DRAWINGS

The accompanying drawings provide an understanding of the invention as described in one or more embodiments to illustrate and explain the principles of the invention.

FIG. 1 is a block diagram illustrating a messaging system in accordance with an exemplary embodiment of the present invention.

FIG. 2 is a block diagram illustrating an alternate architecture of the messaging system shown in FIG. 1.

FIG. 3 is a block diagram illustrating a second alternate architecture of the messaging system shown in FIG. 1.

FIG. 4 is a detailed block diagram illustrating an interface between a server in the unified messaging center and the various communication networks.

FIG. 5 shows a flowchart diagram illustrating the operation of the unified message server shown in FIGS. 1 and 3.

FIG. 6 shows a flowchart diagram illustrating the operation of the middleware server shown in FIGS. 1-3.

FIG. 7 is a detailed block diagram illustrating the user interface shown in FIGS. 1-3.

FIG. 10 shows a flowchart diagram illustrating the operation of the filter mechanism.

FIG. 11 is a detailed block diagram of the telephone adjunct shown in FIGS. 1-3.

DETAILED DESCRIPTION

Figure 8:
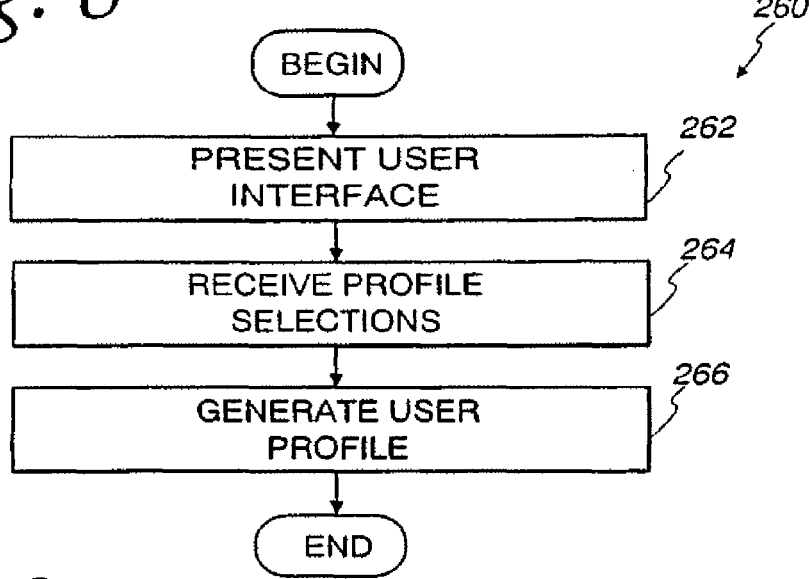
FIG. 8 shows a flowchart diagram illustrating the operation of the user interface.

It will be understood that the following detailed description is exemplary and intended to provide further explanation of the invention as claimed. The present invention relates to an improved unified messaging system that permits one or more legacy messaging systems to be integrated therewith. The legacy messaging systems can include voice mail and e-mail servers using industry standard or proprietary message protocols and formats. Additionally, the legacy systems may be connected to private local area networks (LANs) that are protected against external access by firewall servers.

To integrate the legacy systems, the system of the present invention can include a unified message server, a proxy interface, and a message protocol converter. The proxy interface is configured to access the legacy systems in response to a request from the unified message server. Messages stored on the legacy system are then converted by a protocol convertor to a predetermined format usable by the unified message server. The converted messages are then transferred to the unified message server, which is capable of providing messages from different messaging systems to users in a predetermined format. This arrangement is advantageous in that it permits enterprise-wide communication systems to provide unified messaging without abandoning pre-existing legacy messaging systems.

Turning now to the drawings, and in particular to FIG. 1, there is illustrated an exemplary unified messaging system 20 in accordance with an embodiment of the present invention. The system 20 includes an enterprise communication system 22 in communication with a telephone company (telco) central office (CO) 24 and a dedicated unified messaging center 26. The enterprise system 22 provides conventional telephony and computer services to users within a predetermined enterprise, such as a business or government organization. In the example shown, the telco CO 24 provides leased telephone and voice mail services to the enterprise. The unified messaging center 26 provides unified messaging services to the enterprise 22. The system 20 is configured so that the legacy messaging systems serving the enterprise 22 are integrated into the unified messaging service provided by the center 26.

The enterprise system 22 includes a legacy e-mail server 28, a plurality of computer workstations 30, a network access server (NAS) 32, a middleware server 34, a firewall server 36 and a network router 38. A LAN 46 connects the computer workstations 30, the e-mail server 28, the NAS 32, the middleware server 34 and the router 38. A Centrex group 40 and one or more conventional telephones 42 may also be included in the enterprise system 22. An adjunct display 44 for notifying users of messages may be connected to the telephone 42. The adjunct display 44 can also be attached to or included with any of the terminal units included in the Centrex group 40.

The telco CO 24 includes a local digital switch (LDS) 48 and a voice mail server 50. The LDS 48 provides enterprise-wide telephone service to the enterprise system 22, while the voice mail server 50 provides enterprise voice mail services. The LDS 48 can be a commercially-available class 5 digital switch, such as a Meridian 1 switch manufactured by Nortel, Inc. or a 5ESS switch from Lucent Technologies, Inc. The voice mail server 50 can be a commercially-available voice mail platform, such as the Octel Messaging Server from Lucent Technologies, Inc. or Meridian mail from Nortel, Inc.

Although the system 20 depicts the LDS 48 and voice mail server 50 as residing within the telco CO 24, the services of LDS 48 and voice mail server 50 can be provided by privately owned equipment residing within the enterprise system 22 such as a privately owned voice mail server connected to a private branch exchange (PBX).

Within the enterprise system 22, the computer workstations 30 can be conventional personal computers (PCs) having e-mail client software, such as Lotus Notes, available from Lotus Development Corporation of Cambridge, Mass. The e-mail server 28 can be a conventional PC server including e-mail server software, such as the Lotus Notes server software.

The NAS 32 can be a commercially-available modem pool, such as PortMaster® from Lucent Technologies, Inc. The NAS 32 permits remote users to access the enterprise LAN 46 and its associated resources using a conventional modem dial-up scheme.

The LAN 46 can be a conventional commercially-available computer network, such as an ethernet or token ring LAN. The network router 38 can be a conventional network router permitting data traffic to flow between the LAN 46 and an external computer network 47. The router 38 can be implemented using a commercially-available computer network router, such as one available from Cisco Systems, Inc.

The firewall server 36 can be a conventional PC server configured to limit access to the enterprise LAN and its resources. Typically, the firewall server 36 restricts remote access attempts from outside the enterprise over the computer network 47. The firewall 36 can be implemented using a PC server running a commercially-available firewall software application, such as FireWall-1® from Check Point Software Technologies, Inc. of Redwood City, Calif.

The middleware server 34, can be a PC server running a software program for interfacing the unified message server 64 to the legacy voice mail server 50 and/or the e-mail server 28. The software program can configure the middleware server 34 to provide a proxy interface 52 and a protocol converter 54. The proxy interface 52 establishes communication sessions with the legacy messaging systems so that messages stored by the systems can be accessed and retrieved. The protocol convertor 54 translates the retrieved messages into one or more predetermined formats usable by the unified message 64 and the transfers the converted messages to the server 64.

The proxy interface 52 is configured to connect to either the voice mail server 50 or e-mail server 28 upon receiving a request from the unified message server 64. The request can be an Internet protocol (IP) packet addressed to the middle ware server 34 containing predetermined data representing a command to access a specific legacy messaging system, e.g., the e-mail server 28 or voice mail server 50. The IP packet can also include information regarding the specific user for which messages are to be retrieved. This information can include the user ID and any PIN numbers or access codes required to access the user's account on the legacy systems.

In response to a voice mail access request from the unified message server 64, the proxy interface 52 connects to the voice mail server 50 to check "envelope information" for voice mail messages stored at the server 50. The envelop information can include data such as the identification of the intended recipient(s), the identification of the sender, the date and time the message was received, or information of the same nature. To access the envelop information, the middleware server 34 can use a standard communication connection, such as a X.25 connection, to communicate with the voice mail server 50 by way of the LDS 48.

The presence of envelope information corresponding to the access request from the message server 64 indicates that retrievable messages are present at the voice mail server 50. Accordingly, if envelope information is detected, the proxy interface 52 performs a login emulation to gain access to the messages stored on the voice mail server 50. Otherwise, the proxy interface 52 returns a message to the unified message server 64 indicating that no voice mail messages are currently retrievable from the voice mail server 50.

The login emulation connects to the voice mail server 50 using a conventional dial-up login sequence. The middleware server 34 includes a dual tone multi-frequency (DTMF) dialer (not shown) for calling into the voice-mail server 50. The DTMF dialer can be interfaced and controlled by the proxy interface 52 using conventional operating system (OS) drivers. When the voice-mail server 50 answers the call placed by the proxy interface 52, the proxy interface 52 executes a predetermined sequence of DTMF signals to playback the stored voice mail messages. The predetermined sequence of DTMF signals can be programmed into the proxy interface 52 for particular voice mail servers. The timing and the tones generated in the sequence are ordered gain access by way of the voice mail server's interactive voice response (IVR) interface normally used by subscribers. The information represented by the sequence can include user ID or PIN numbers, and touch-tone key strokes sufficient to navigate the IVR interface to playback the messages. The proxy interface 52 then records and digitizes the messages as they are played back.

To accomplish this the middleware server 50 includes a standard audio/digital code (A/D) converter (not shown), for converting the audio playback to digitized voice mail messages. The A/D converter can be interfaced to the proxy interface 52 using standard OS drivers. The digitized voice-mail messages are then converted and compressed by the protocol converter 54 using standard digital audio compression formats such as .wav or 0.32 k adpcm. The protocol converter 54 then transfers these compressed, digitized voice mail messages to the unified message server 64 by way of communications network 47.

To access the legacy e-mail server 28, the proxy interface 52 sends a connection request to the server 28 over the LAN 46. Communication between the proxy interface 52 and the e-mail server 28 can be established using an industry standard e-mail protocol, such as POP3 (post office protocol 3) or IMAP4. The connection request can include the user's e-mail account identifier and password, if necessary. If e-mail messages are retrieved from the e-mail server 50, the proxy interface 52 transfers the messages to the protocol converter 54. To transfer the e-mail messages, the proxy interface 52 can command the e-mail server 28 to forward the messages to the protocol converter 54. Upon receiving the e-mail messages, the proxy converter 54 sends them to the unified message server 64 using either the POP3 or IMAP4 protocol.

Alternatively, the unified message server 64 can bypass the middleware server 34 and directly access the legacy e-mail server 28. To accomplish this, the unified message server 64 can include one or more software programs for directly connecting to the e-mail server 28 using POP3 or IMAP4. The access request and user account information can be directly passed to the e-mail server 28 once an e-mail session is established between the unified message server 64 and e-mail served 28.

For interfacing to legacy e-mail servers using non-standard e-mail protocols, the unified message server 54 accesses the e-mail server 28 through the middleware server 34. In such cases, the proxy interface 52 can be configured to communicate with the legacy e-mail server 28 using the proprietary or non-standard protocol. Upon retrieving messages, the interface 52 passes the e-mail messages to the protocol converter 54, which translates the e-mail from the non-standard format to a standard format, such as POP3 or IMAP4.

The proxy interface 52 and protocol convertor 54 can be implemented using the Congruity Software Package available from Nortel Networks, Inc. The Congruity software that runs on a conventional PC or workstation with a standard operating system (OS) such as Windows NT or UNIX provides session and interface management between the unified message server 64 and legacy messaging systems, such as the voice-mail server 50 and the e-mail server 28. The Congruity software is built using a software Development Environment available with the software package. Using the Development Environment, the Congruity software adaptors can be built for carrying out the functionalities of the proxy interface 52 and protocol convertor 54, respectively. Typically, a predetermined library of software adaptors is provided with the Congruity software. The adaptors are software components that can define the behavioral aspects of the proxy interface 52 and protocol converter 54. For example, Congruity software adaptors can be built to handle the middleware server 34 responses to unified message server requests in accordance with the invention.

The communication network 47 can be a public IP-based network such as the Internet.

The unified messaging center 26 includes the unified message server 64, a notification server 66, a user interface 68, a network router 70 and a firewall server 71. The components of the messaging center 26 operate in conjunction with those of the enterprise system 22 to provide unified messaging services to the enterprise users.

The firewall server 71 serves essentially the same purpose as the firewall 36 included in the enterprise system 22, i.e., it restricts access to the messaging center 26 over the public network 47. The router 70 can be a conventional commercially-available router, such as one available from Cisco Systems, Inc.

The unified message server 64 can be a PC server configured to receive various types of messages from disparate messaging systems. The unified message server 64 permits users to receive their messages by way of a single interface. The particular interface and accessing mechanism is user selectable. For example, by way of the user interface 68, a subscriber can configure the unified message server 64 to deliver different types of messages to an e-mail account that is accessible over the Internet 56. Alternatively, the subscriber can configure the message server 64 to deliver messages to a cellular phone by way of a cellular network 58 or a pager by way of a paging network 60, or a conventional telephone by way of a public switch telephone network (PSTN) 62.

The unified message server 64 can be implementing using a PC server executing software to provide the services available from the JFAX.COM. The JFAX unified messaging service receives voice mail, e-mail, and fax messages and provides them to respective users by way of e-mail or telephone. For message retrieval using e-mail, each user is provided with a JFAX e-mail account. The JFAX server can poll disparate remote messaging systems where the user has pre-existing accounts, including the legacy messaging servers 28, 50, in order to retrieve messages and then store them locally on the unified server 64. The retrieved messages are placed in the respective JFAX e-mail accounts, where users can then retrieve them using standard e-mail software on a PC or a web page interface provided by JFAX.COM. Voice mail messages can be provided as .wav e-mail attachments that can be audibly played back at a user's PC if the PC includes standard audio .wav decompression software.

JFAX.COM also provides a 1-800 dial-up service for retrieving disparate type of messages. Using this scheme, a user can dial into JFAX and listen to voice mail and e-mail messages. The unified message server 64 can be interfaced to a text-to-speech (TTS), generator to convert the e-mail messages to audio messages that can be heard over the phone. Details of a TTS interface are described herein in connection with FIG. 4.

The notification server 66 can be a PC based server configured to transfer notification messages to users, notifying them of particular events, such as the receipt of a new message by the unified message server 64. Users can configured the notification server 66 by way of a user interface 68. The notification server 66 can be configured to transfer notification messages to users over one or more preselected communication networks. For example, the notification server 66 can transfer notifications by way of fax, voice-mail or conventional telephone over the PSTN 62, or messages to pagers or cellular phones over the paging network 60 and cellular network 58, respectively, or messages over the Internet 56. The notification server 66 can be configured to deliver notices over any or all of the available communication networks, depending on the preferences of the respective users.

The notification server 66 generates and transmits message notices based on message information received from the unified message server 64. The message information can include any of the envelope information described herein in connection with the legacy voice mail server 50. Generally, the notices include the identification of the sender, a subject header (if available), the time and date of receipt, and the message type, e.g., voice mail, e-mail, fax, etc. To facilitate timely delivery of the notices, the notification server 66 can be configured to poll the unified message server 64 at predetermined intervals to check for new messages. The notification server 66 and the unified message server 64 can communicate using a conventional PC LAN. The message information can be stored in predetermined data files having a predetermined format on the unified server 64, the data files being accessible to the notification server 66.

The user interface 68 permits users to generate user profile. The user profile are computer data files that specify operational parameters for the notification and unified message servers 64, 66 corresponding to each user. In particular, the user profiles can define specific actions to be, taken by the servers 64, 66 in response to messages received from particular sources or regarding particular subjects.

FIG. 2 is a block diagram of a unified messaging system 100 having an alternative architecture to the messaging system 20 shown in FIG. 1. The messaging system 100 performs essentially the same function and has the same features as the messaging system 20 shown in FIG. 1. However, the alternative messaging system 100 relies on a trusted network connection 101, instead of a public network, for communications between the unified messaging center 26 and the enterprise system 22. In this arrangement, firewall servers 36, 71 are not required to restrict public access to the enterprise system 22 or unified messaging center 26.

FIG. 3 is a block diagram illustrating a second alternative architecture 110 of the messaging system 20 shown in FIG. 1. In this architecture 110, the middleware server 34 resides in the unified messaging center 26 and is connected to the unified message server 64 by way of a LAN 65.

FIGS. 1-3 show several specific architectures for implementing the messaging system of the present invention. It will be readily apparent to one of ordinary skill in the art that many alterative architectures exist that fall within the scope of the invention. For instance, any or all of the components of the unified messaging center 26 can be included within the enterprise system 22. The communication networks 47, 101 can be readily configured to support this arrangement.

FIG. 4 is a detailed block diagram illustrating an, interface 120 for connecting the unified message server 64 to the various communication networks 56-62. The interface 120 can also be incorporated in the notification server 66 to likewise provide a connection to the communication networks 56-62. When included in the notification server 66, the interface 120 can pass notification messages on the users.

The interface 120 includes a text-to-synthesizer (TTS) 122, a conventional facsimile (fax) interface 124, a conventional dual-tone multi-frequency (DTMF) dialer 126, a conventional TCP/IP interface 128, and a conventional MODEM interface 130. These interface components permit the unified server 64 to communicate with each of the various communication networks 56-62. Each interface component can be implemented using commercially-available PC peripheral devices configured to communicate with the server 64 using standard APIs in, the Windows OS.

In particular, the TTS, 122 generates spoken messages in response to computer readable text messages received from the unified message server. The synthesized speech can be used to audibly notify a subscriber by way of the voice mail 136, cellular phone 138, or the conventional telephone 142. The TTS 122 can be implemented using standard components, such as TruVoice from Centigram Communications Corp. of San Jose, Calif. or DECtalk from Digital Equipment Corp. of Massachusetts. The fax and MODEM interfaces 124, 130 can be a conventional personal computer fax card, such as a FAX/Modem PC Card from Boca Research, Inc. of Boca Raton, Fla. The fax interface 124 can permit the unified server 64 to transfer messages to subscribe is by way of the fax 134. The DTMF dialer 126 can be a conventional telephony interface for use with standard personal computers, such as the Alcatel 4961 TAPI Middleware from Alcatel of Paris, France. The DTMF dialer 126 can be used to connect to each of the communications networks that rely on a conventional dial-up telecommunications network, such as the PSTN 62.

The TCP/IP stack 128 can be commercially-available software program running on a standard PC operating system, such as Window NT. The stack 128 permits the server 64 to communicate messages to subscribers over data networks using the TCP/IP protocol, such as the Internet 132.

FIG. 5 illustrates a flow chart diagram 160 depicting the operation of the unified message server 64 in accordance with an embodiment of the present invention. In step 162, the unified message server 64 submits an access request to the firewall server 36. The access request can be an IP message requesting that the firewall server 36 of the enterprise system 22 permit the unified message server 64 to remotely query the middleware server 34. The firewall server 36 can be configured so that only the unified message server 64 can query servers residing on the LAN, 46. This can be accomplished by configuring the firewall 36 to recognize the IP address of the unified message server 64 so that the incoming IP packets from the unified message server 64 are allowed to pass through the firewall 36 onto the LAN 46. To further insure security, the firewall server 36 can be configured to insure that all returned messages passing from the LAN 46 to the communications network 47 are returned only to the IP address of the unified message server 64. In this manner, the firewall server 36 permits the unified message server 64 to submit access requests to the middleware server 34, which in turn transfers messages from the legacy message systems 28, 50 to the unified message server 64.

After negotiating access to the LAN 46 from the firewall 36, the unified message server 64 submits an access request to the middleware server 34 (step 168); The access request is a message instructing the middleware server 34 to access the legacy message systems to determine whether or not there are any messages residing therein. The request can specify which legacy system is to be accessed. Also, the request can specify user account information, such as login IDs and passwords, defining which messages are to be retrieved from the legacy systems. After submitting the request to the middleware server 34, the unified message server 64 waits for a response from the middleware server 34 (step 170). If the middleware server 34 sends an acknowledgment to the unified server 64 indicating that there are no messages on the legacy systems, the unified message server 64 terminates the communication session with the middleware server 34. However, if the middleware server 34 returns one or more messages from the legacy message servers associated with the enterprise system 22, the unified message server 64 stores the messages internally for later retrieval by a user (step 172).

FIG. 6 is a flow diagram 190 illustrating the operation of the middleware server 34. In step 192, the middleware server 34 receives an access request from the unified message server 64. In response to this request, the proxy interface 52 of the middleware server 34 accesses a specified legacy messaging system 28, 50 (step 194). As described earlier in connection with FIG. 1, the proxy interface 52 can first query the legacy message server to determine the presence of messages. If there are messages stored on the legacy message server, the proxy interface 52 then performs a login emulation to access the stored messages. Upon successfully logging-in to the message server, the proxy interface 52 retrieves stored messages and provides them to the protocol converter 54 (step 198). The protocol converter 54 then converts the messages to a standard digital format usable by the unified message server 64. After converting the messages, protocol converter 54 transfers the converted messages to the unified message server 64 (step 200).

User Interface to the Unified Messaging Center

FIG. 7 is a detailed block diagram illustrating the user interface 68 included in the unified messaging center 26. The user interface 68 can include a web server 220, an integrated voice response (IVR) system 222, and a profile server 224. The user interface 68 permits subscribers of the unified messaging system to generate user profiles byway of either the Internet 56 or the PSTN 62. The user profiles are data files that define how the unified messaging system will respond to incoming messages, according to the specific desires of the users. The user profiles can be stored on the profile server 224 and made available to the notification server 66, the middleware server 34, and the unified message server 64.

Users can generate user profiler by way of the web server 220 or the IVR 222. The web server 220 can be a standard PC server running conventional web site server software, and having an assigned an IP address so that it is readily accessible by users over the Internet 56. The web server software can be configured to present one or more web pages that collect user information, selections, and preferences that can be used to compile a profile. The information gathered can include user PINs, account login IDs, as well as Internet addresses, phone numbers, or other similar information regarding access to legacy messaging systems. Preferences and selections input by users can include instructions on how to process incoming messages. This processing includes the routing of incoming messages and the notifications thereof. It also includes storing or discarding incoming messages based on their attributes. For example, a user can request that all incoming messages are sent to an e-mail box and all notifications are sent to a particular pager number. Additionally, the user can also request that messages from a particular source or regarding a specific subject are discarded, rather than stored for later retrieval. As will be discussed herein below, a filter mechanism is included in the unified message system for processing incoming messages in accordance with the user profiles.

The IVR 222 can be a commercially available IVR system configured to gather user profile information by way of a touch-tone phone. Users can dial into predetermined phone number using the PSTN 62 to access the IVR interface 222. The IVR 222 can then play a predetermined sequence of voice-prompted menus that permit the user to enter information, preferences, and selections by way of touch-tone responses. In addition, the IVR 222 can include voice recognition capabilities that permit users to speak their responses.

The web server 220 and IVR 222 generate user profiles in standard data file formats. These profiles are transferred to the profile server 224 by way of a conventional LAN 225. The profile server 224 can be a conventional PC server running a standard OS such as Windows. The profile server 224 is configured to store a user profile for each user of the unified messaging system. Default user profiles can be stored for users not updating or entering particular requests into their profiles through the user interface 68. The profile server 224 can provide user profiles to the notification server 68 and the unified message server 64 using a conventional LAN interface.

FIG. 8 illustrates a flow chart diagram 260 of a method of operating the user interface 68 in a set-up mode to generate the user profile. In step 262, the user interface presented to the user on the web server 220 or the IVR 222. With the web server 220, the user interface can be a web page configured to gather user selections and information to generate an HTTP file which is then provided to the profile server 224 as a user profile. With the IVR 222, the user can use a touch-tone phone to key in selections, configuring a user profile which is then output by the IVR 222 as a computer data file having a standard format and stored on the profile server 224.

In step 264, the profile selections made by the user are received and stored by the profile server 224. The user selections can identify message attributes and their corresponding flags for determining which actions are to be taken with respect for incoming messages to the user. Message attributes are items of information associated with messages, such as sender ID, destination ID, subject header, and the like. The flags can be software variables indicating particular actions to be taken by either the notification server 66 or message server 64. For example, a flag can be set to indicate that an incoming message is to be stored, while another flag can indicate whether a notice is to be generated, and yet another flag can indicate which network is to be used to communicate the notice of the user. In step 266, the user profile containing the selections is generated and stored by the profile server 224. The user profile is then provided to the notification server 66 and the unified message server 64. The user profiles can be provided directly to the servers 64 and 66, and stored there or alternatively, the profile can be stored locally on the profile server 224 and the servers 64, 66 can actively poll the profile server 224 at predetermined intervals to receive updated user profiles.

Figure 9:
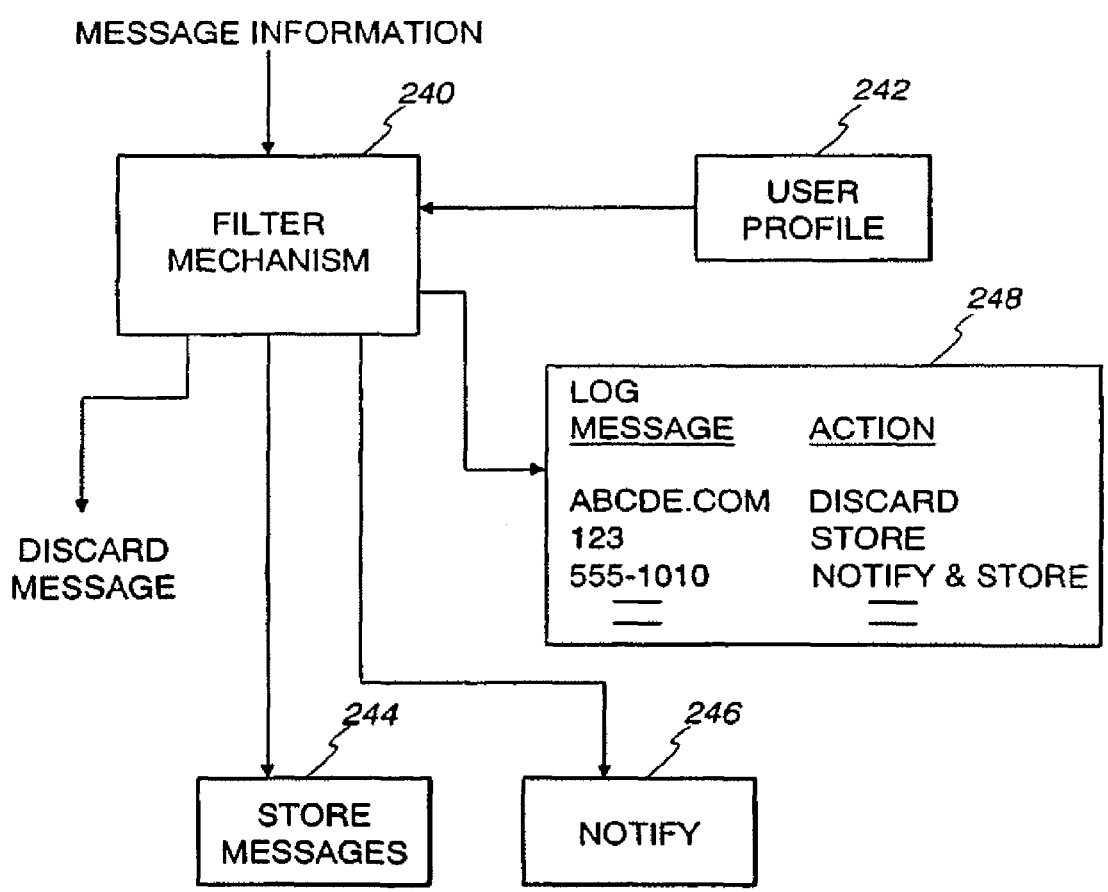
FIG. 9 is a block diagram conceptually illustrating the operation of the user profile filter mechanism included in the unified message server.

FIG. 9 is a block diagram conceptionally illustrating the operation of the user profile filter mechanism 240 included in the unified message server 64. The filter mechanism 240 receives as input the user profile 242 and message information derived from each incoming message to the unified message server 64. The user profile 242 is a computer-usable data file that can indicate various operational actions to be taken with respect to the incoming message, such as which communication network(s) are to be used for transferring message notices, as well as the messages themselves, to a respective user. In addition, the user profile 240 can be used to indicate whether messages from specific sources or regarding specific subjects are to be stored 244 on the server 64 or discarded. Based on the user flag selections contained in the user profile corresponding to an attribute of a received message, the filter mechanism 240 can transfer the message to the message storage 244 or the notification server 246. The filter mechanism 240 can also generate a log file 248 summarizing the processing actions taken regarding particular messages received by the server 64. In the example shown, the first column of the log 248 identifies the incoming message, while the second column indicates the action(s) taken with respect to the message.

The notification server 66 relies on user profile information to generate the route notice messages according to user selection. A user can generate a profile that indicates whether notices are to be generated, that includes "exclude lists" or "include lists", and that indicates which communication network(s) are to be used for notification. An "exclude list" includes message attributes such as sender IDs or subjects, that define incoming messages for which no notices are to be generated, while "include lists" include message attributes that define incoming messages for which notices are to be generated.

The unified message server 64 includes a filter mechanism 240 that applies profile information to each incoming message in order to process the message according to the recipients wireless. The filter mechanism 240 can be a software routine executed by the server 64 to provide the message filtering functions disclosed herein.

FIG. 10 shows a flow chart diagram illustrating a method 280 of operating the filter mechanism 240. In step 282, message information corresponding to an incoming message is received from the unified message server 64. The message information can include various message attributes, such as the identification of the sender, recipient, subject header, and the message type. In step 284, the user profile 242 is received by the filter mechanism 240. Generally, the filter mechanism 240 retrieves the user profile corresponding to the intended recipient of the incoming message. The recipient can be identified from the message information derived from the incoming message. The filter mechanism 240 can temporarily store the user profile 242 for later comparison with incoming messages. Upon receiving the user profile, the filter mechanism 240 compares the incoming message information to the attributes in the user profile 242 (step 286). Based on the comparison between the message information and the user profile 242, the filter mechanism 240 processes the incoming message. The processing actions include, among other things, discarding the message, storing the message in the message storage 244 in a user selected format, and generating a message notification 246 by alerting the notification server 66 (step 288).

To perform comparisons, the filter mechanism 240 compares attributes contained in the message information to those stored in the user profile. The filter mechanism 240 then checks any flags in the user profile 242 corresponding to matching attributes, and accordingly, processes the message according to the user-set flags contained in the user profile.

Telephone Adjunct Display

FIG. 11 is a detailed block diagram of the telephone adjunct 44 shown in FIGS. 1-3. The telephone adjunct 44 permits a user to be visually notified of an incoming messages. The visual notification can be a flashing light emitting diode (LED) and/or a human-readable display describing characteristics of each of the waiting messages, such as the identification of the sender, subject header, message type, time and date received, and the like.

The telephone adjunct 44 includes an interface, such as a conventional modem 302, for transferring information between the notification server 66 and the adjunct 44. The modem 302 can be a commercially-available modem that is software configurable and has a predetermined microprocessor-compatible interface. The message information received by the modem 302 is processed by a conventional microprocessor (μP) 300 and then visually displayed by a liquid crystal display (LCD) 304. A memory 308 can store incoming message information from the notification server 66, as well as a computer program for configuring the microprocessor 300 to receive, process and display the message information. A standard microprocessor bus 310 connects the components included in the adjunct 44. A conventional LCD microprocessor-compatible driver 306 permits digital information carried on the bus 310 to be displayed on the LCD 304.

Figure 12:
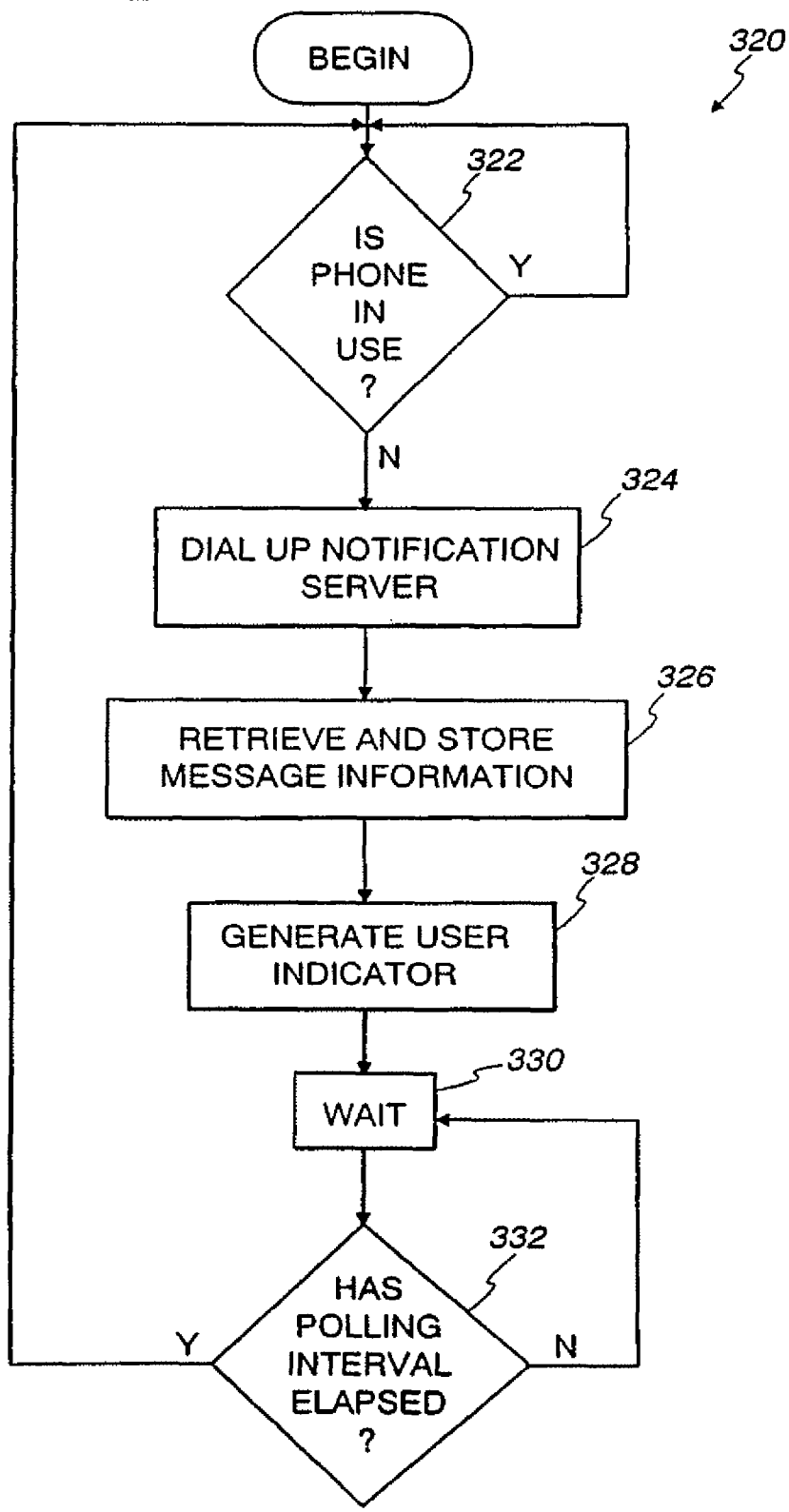
FIG. 12 shows a flowchart diagram illustrating the operation of the telephone adjunct shown in FIG. 11.

FIG. 12 shows a flow chart diagram of a method 320 of operating the adjunct 44 for providing visual message notification to a user located within the enterprise system 22. The adjunct 44 gathers message information from the notification server 66 by dialing up the notification server using the modem 302 to retrieve message information at regular intervals. In step 322, the adjunct first determines whether the host phone to which it is attached is in use. The host phone can be a conventional telephone 42 to which the adjunct 44 is connected. This check is performed by the microprocessor 300 configuring the modem 302 to sense whether the dial tone is present on the phone line to which the adjunct 44 is connected. When the phone is in use, the adjunct 44 resets a polling interval and waits a predetermined time before trying to dial-up the notification server 66.

When the phone line is not in use, the microprocessor 300 directs the modem 302 to dial-up the notification server 66 (step 324). In step 326, the adjunct 44 retrieves message information from the notification server 66 and stores it locally within, the memory 308. In connecting to the notification, server 66, the adjunct 44 first presents a conventional caller ID signal including the alphanumeric identification (ANI) of the telephone 42 to which the adjunct 44 in connected. The notification server 66 can be configured to detect the incoming caller ID signal. In response to the caller ID signal, the notification server 66 determines whether any message information is currently available for the particular adjunct 44 corresponding to phone number included in the caller ID signal. If not, a notification server 66 simply hangs up on the calling adjunct 44, or alternatively, it does not answer the phone call. The message information is stored at the notification server 66 corresponding to the user's ANI. If message information corresponding to the adjunct 44 is stored on the server 66 the notification server 66 answers the incoming call and permits the adjunct 44 to retrieve the message information. The message information is retrieved by the adjunct 44 using a predetermined standard data transfer protocol, such as TCP/IP. The transfer session can be initiated by the microprocessor 300, which can be programmed to execute the predetermined protocol. The message information itself can be stored in predetermined data files and formats usable by both the notification server 66 and adjunct 44. The information can be represented as ASCII text. After the adjunct 44 has completed downloading the message information, the server 66 disconnects the call.

After receiving message information from the server 66, the adjunct 44 generates the user indicator which visually indicates to a user that message information has been downloaded to the adjunct 44 (step 328). The visual indicator can be a symbol or alphanumeric message presented on the LCD 304, or alternatively, it can be a light emitting diode (LED) which is lit when message information is available. The alphanumeric message can be text describing characteristics of a particular message, such as the type of message, its subject and sender. For multiple messages, the adjunct 44 can include a user interface (not shown), such a momentary-contact push button, for permitting a user to scroll through the message information on the display 304. The user interface can be controlled by the microprocessor 300. For example, a push-button can be provided that generates an interrupt to the microprocessor 300. In response to the interrupt, the microprocessor 300 executes a software routine that retrieves the next record of message information from the memory 308 and displays it on the LCD 304.

After downloading message information, the adjunct 44 waits a predetermined amount of time before polling the notification server 66 to check if additional messages have been received (step 330). In step 332, a check is made to determined whether the polling interval has elapse. The microprocessor 300 can execute a software routine providing a timer function for determining the interval. If the interval has not elapsed, the adjunct 44 continues to wait (step 330). If the interval has expired, the adjunct 44 returns to step 322 to repeat the polling routine.

As described earlier herein in connection with FIG. 4, the notification server 66 can include a modem-interface 130. In addition to sending outgoing notices, the modem interface 130 can be configured to receive incoming calls from adjuncts requesting transfers of message information for local display to users. The server 66 can include software for transferring message information to the adjunct 44 according to the predetermined protocol.

It should be appreciated that a wide range of changes and modifications may be made to the embodiment of the invention as described herein. Thus, it is intended that the foregoing detailed description be regard as illustrative rather than limiting and that the following claims, including all equivalents, are intended to define the scope of the invention.

What is claimed is:

1. A messaging system, comprising:
   a unified message server to provide messages from different messaging systems to users in a predetermined format;
   a first firewall server to provide a first firewall between the unified messaging server and a public network;
   a second firewall server to provide a second firewall between an enterprise network and the public network;
   a proxy interface, coupled to the enterprise network, to access a legacy messaging system coupled to the enterprise network in response to a request receiving from the unified message server from via the public network; and
   a message protocol converter, coupled to the enterprise network, to convert messages stored by the legacy messaging system to a predetermined protocol usable by the unified message server;
   wherein the unified message server supports a web page user interface enabling a user to specify the predetermined format selected from an e-mail format, a cellular telephony format, and a public switch telephony format.

2. The system of claim 1, further comprising program instructions for accessing the legacy messaging system through the second firewall from behind the first firewall.

3. The system of claim 2, wherein the program instructions include processor executable program instructions for configuring the second firewall to accept remote queries from the unified message server that are directed to the legacy messaging system.

4. The system of claim 1, wherein the legacy messaging system is selected from a voice mail system and an email system.

5. The system of claim 1, wherein the proxy interface includes a data file containing predetermined user information for accessing the legacy messaging system.

6. A system for providing unified messaging services, comprising:
   a unified message server to provide messages from disparate messaging systems to users in a predetermined format;
   a first firewall to provide a first firewall between the unified message server and a public network;
   a legacy email system, connected to an enterprise network, to receive and store email messages;
   a legacy voice mail system, connected to the enterprise network, to receive and store voice mail messages;
   a second firewall to provide a second firewall between the enterprise network and the public network;
   a middleware server, connected to the enterprise network, including:
      an email proxy interface to access the legacy email system in response to a first request of the unified message server received from the unified message server via the first firewall, the public network, and second firewall;
      a voice mail proxy interface to access the legacy voice mail system in response to a second request of the unified message server received from the unified message server via the first firewall, the public network, and second firewall; and
      a message protocol converter, operatively associated with the voice mail proxy interface to convert voice mail messages stored by the legacy voice mail system to a predetermined protocol usable by the unified message server;
   wherein the unified message server includes a web page user interface enabling a user to specify the predetermined format from an e-mail format, a cellular telephony format, and a public switch telephony format.

7. The system of claim 6, further comprising:
   a notification server, operatively connected to the unified message server, to send notification messages notifying users them of particular events, such as the receipt of a new message by the unified message server.

8. The system of claim 7, wherein the firewall server accepts remote queries from the unified message server that are directed to the legacy email system.

9. The system of claim 7, wherein the firewall server accepts remote queries from the unified message server that are directed to the legacy voice mail system.

10. The system of claim 6, wherein the communications network includes an Internet protocol compatible public network.

11. A unified message delivery method, comprising:
    receiving, by a unified message server, user input provided to a web page user interface and specifying a unified format selected from: an e-mail format, a cellular telephony format, and a public switch telephony format;
    sending, by the unified message server, an access request via a first firewall between the unified message server and a public network and a second firewall between the public network and an enterprise network, to a legacy messaging server of the enterprise network;
    responsive to receiving, from the enterprise network, a unified message having the unified format, delivering the unified message to an end user.

12. The method of claim 11, further comprising:
    configuring the first firewall to accept queries from the unified message server that are directed to the legacy messaging system.

* * * * *